(12) United States Patent
Meloche (10) Patent No.: US 8,457,004 B2
(45) Date of Patent: Jun. 4, 2013

(54) SYSTEM AND METHOD FOR ANALYZING AND TESTING PACKET FLOWS TO LOCALIZE PROBLEMS

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 294 days.

(21) Appl. No.: 12/827,578

(22) Filed: Jun. 30, 2010

(65) Prior Publication Data

US 2011/0211459 A1    Sep. 1, 2011

Related U.S. Application Data

(60) Provisional application No. 61/309,192, filed on Mar. 1, 2010, provisional application No. 61/312,498, filed on Mar. 10, 2010.

(51) Int. Cl.
*H04L 12/26* (2006.01)
(52) U.S. Cl.
USPC ........................................... 370/245; 370/236
(58) Field of Classification Search
CPC ................. H04L 29/06265; H04L 41/5025
USPC ........................ 370/245, 248, 238; 709/224
See application file for complete search history.

(56) References Cited

U.S. PATENT DOCUMENTS

| 6,958,977 | B1* | 10/2005 | Mitrani et al. | 370/252 |
| 6,990,616 | B1* | 1/2006 | Botton-Dascal et al. | 714/715 |
| 7,397,801 | B2* | 7/2008 | Zuberi et al. | 370/395.21 |
| 7,835,293 | B2* | 11/2010 | Cidon et al. | 370/248 |
| 2002/0133575 | A1* | 9/2002 | Cidon et al. | 709/220 |

* cited by examiner

*Primary Examiner* — Ricky Ngo
*Assistant Examiner* — Ben H Liu (57) ABSTRACT

Disclosed herein are systems, methods, and computer-readable storage media for analyzing packet flows and generating an alarm and for active testing of a network to localize problems. The system analyzes packet flows for bitstreams associated with a network node in order to compute a measure of protection that a queue of the network node gives to a high-priority one of the bitstreams relative to a low-priority one of the bitstreams, and uses the measure of protection to determine whether the network node is a source of a protection error with respect to priority markings for packets flowing through the network node, and generates an alarm upon determining that the network node is a source of a protection error with respect to the priority markings for the packets flowing through the network node.

15 Claims, 9 Drawing Sheets

|   |   |   |
|---|---|---|
| 0 | 0.2 | 0.0 |
| 0.0 | 0 | 0.0 |
| 0.0 | 0.2 | 0 |

910 — PROTECTION ERROR FOR PE ROUTER #2
912 (middle column highlighted)

FIG. 11

|   |   |   |
|---|---|---|
| 0 | 0.2 | 0.0 |
| 0.0 | 0 | 0.0 |
| 0.0 | 0.2 | 0 |

920 — PROTECTION ERROR FOR CE ROUTER #3
922 (bottom row highlighted)

SYSTEM AND METHOD FOR ANALYZING AND TESTING PACKET FLOWS TO LOCALIZE PROBLEMS

RELATED APPLICATIONS

This application claims the benefit of U.S. Provisional Application No. 61/309,192, filed 1 Mar. 2010, and the benefit of U.S. Provisional Application No. 61/312,498, filed 10 Mar. 2010, each of which is incorporated herein by reference in its entirety.

BACKGROUND

1. Technical Field

The present disclosure relates to network management and more specifically to analyzing and testing flows of packets in a packet network.

2. Introduction

In certain packet networks, network hardware can mark packets for processing through the network. Such markings can identify a packet as an audio packet, video packet, or data packet, for example. In one common configuration, the network infrastructure grants audio packets the highest priority, followed by video packets and then data packets. A problem arises in which a network administrator cannot identify a node or network segment which may be processing the packets in error. For example, a particular customer edge (CE) or provider edge (PE) device may be reading or interpreting packet markings in error and thus inappropriately treating high priority audio packets as data packets. As another example, a marking mechanism may be mismarking the packets, thus causing them to be inappropriately processed even though the network infrastructure is reading the packets correctly. Currently, it is very difficult for a network administrator to localize or identify a problem within the network in the scenarios set forth above. What is needed in the art is an analysis mechanism which enables an administrator to determine which node or entity or policy in the network is causing such a problem.

Second, insufficient and inconsistent data flows make testing even more difficult and time consuming. Accordingly, what is needed in the art is a mechanism to test the viability of detection and performance of network transmission of marked packets on a localized basis.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing a packet network for analyzing and testing packet flows to localize problems with respect to priority markings for the packets. The method includes analyzing packet flows for a plurality of bitstreams associated with a network node in order to compute a measure of protection that a queue of the node gives to a high-priority one of the bitstreams relative to a low-priority one of the bitstreams. The method also includes using the measure of protection to determine whether the node is a source of a protection error with respect to priority marking for packets flowing through the node. The method further includes generating an alarm upon determining that the node is a source of a protection error with respect to the priority marking for the packets flowing through the node.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved network management approaches for processing, analyzing, and/or testing packet flows. A brief discussion of foundational principles and examples are provided first, followed by a discussion of a basic general purpose system or computing device in FIG. 1 and an example network configuration which can be employed to practice the concepts disclosed herein. A more detailed description of methods and system will then follow.

When an enterprise gets a circuit from an internet service provider (ISP), the enterprise can carve up the circuit into sections reserved for audio, video, and data, for example. The number of sections can be one or more, but one common configuration is at least three sections. The size of the data rate, or bandwidth, of each respective section is called a committed data rate (CDR). The sections are referred to as classes of service (COS). For some ISPs, COS 1 is a strict priority section and is usually used for audio traffic, although the enterprise can change this configuration. For example, an enterprise can put video traffic in COS 1.

The enterprise indicates the class of service that is intended for each packet by marking each packet with a differentiated service code point (DSCP) marking that can be located in the packet header, for example. One commonly used value, 46, indicates that a packet belongs to COS 1. The actual value used is arbitrary. The enterprise should indicate to the ISP how the DSCP values map to the various COSs to obtain benefits from this approach.

The ISP implements the desired priority on customer edge (CE) network hardware such as routers for outgoing traffic and on provider edge (PE) network hardware such as routers for incoming traffic. The routers are typically located in the boundary between a high speed network (i.e. the enterprise local area network or LAN) and a more limited capacity link (the ISP's network). Thus, a packet sent from one enterprise location to another would traverse the network in this sequence: first enterprise LAN, first enterprise CE, ISP PE for the first enterprise, ISP cloud, PE for the second enterprise, second enterprise CE, second enterprise LAN.

The limited capacity links are between the CE and PE pairs. Because the first enterprise LAN is high speed compared to the CE/PE outgoing link, the CE must prioritize how it sends traffic and what traffic to send to the PE. The CE prioritizes traffic by forming queues for each COS. The CE inserts incoming packets into each queue based on the packet markings and transmits packets to the PE according to priorities that result in different levels of end-to-end performance for each COS. Essentially the same approach applies at the second enterprise because the ISP cloud is high speed compared to the PE/CE incoming link except that the PE prioritizes the traffic sent to the CE.

COS 1 is special because it confers strict priority to COS 1 marked packets. The ISP router that prioritizes enterprise traffic gives COS 1 packets a strict priority in that it will not transmit packets marked as non COS 1 unless the COS 1 queue is empty. Such preferential treatment is given to all COS 1 packets provided that the amount of COS 1 traffic does not exceed the COS 1 CDR. If COS 1 traffic exceeds the COS 1 CDR, the routers may simply drop the excess COS 1 traffic.

The other queues are treated jointly, but the router drains each of the remaining queues at a speed that is proportional to their respective CDR. For example, if the router has a COS 2 queue with CDR 20 and a COS 3 queue with CDR 10, the router will transmit twice as much traffic from the COS 2 queue than from the COS 3 queue, draining the COS 2 queue twice as fast as the COS 3 queue. This is how video packets in the COS 2 queue can get better treatment than data packets in the COS 3 queue, for example.

The queues other than COS 1 are also limited by their respective CDRs in a similar manner to the COS 1 queue, but the effect of their CDR is different than for the COS 1 queue. When the router receives too much traffic for a COS, it designates the excess traffic as "out of contract". Such "out of contract" packets are not necessarily dropped, but the service level agreement (SLA) contract with the ISP does not apply to them. Once a packet has been designated as in or out of contract, it is subject to a certain probability of being dropped depending on the designation and on how full the corresponding queue is.

Out of contract packets are simply more likely to get dropped than in contract packets. If the amount of incoming traffic approaches circuit capacity, at least a portion of the out of contract packets is very likely to be dropped.

Because of the priority associated with COS 1, the router does not hold COS 1 packets in a long backlog in a queue. The router basically transmits a COS 1 packet as soon as it arrives with a delay that consists of whatever the router hardware had already committed to transmit at the time the COS 1 packet arrived, which is typically a very insignificant delay. This leads to extremely low levels of jitter for packets in COS 1 because they are handled as they arrive. Jitter is an audio effect particularly noticeable in real-time audio applications such as voice over IP (VoIP) due to out-of-order arrival or high variability in transmission latency of audio packets.

As a result, in the scenarios outlined above, it is perfectly plausible to have packet loss in COS 1, but no packet loss in COS 2 and/or COS 3. This can indicate that the COS 1 CDR has been exceeded. It is also possible to have massive loss in COS 2 and/or COS 3 with no or minimal loss in COS 1. This can indicate that the amount of traffic received exceeds the circuit capacity but that the amount of COS 1 traffic is less than the COS 1 CDR. It is possible to have very little jitter in COS 1 and substantial jitter in COS 2 and/or COS 3. This can indicate heavy COS 2 and/or COS 3 traffic. Thus, even when there is loss in COS 1, the packets that do make it through experience very little jitter. Various embodiments based on an understanding of these principles shall be discussed herein. The disclosure now turns to FIG. 1.

Figure 1:
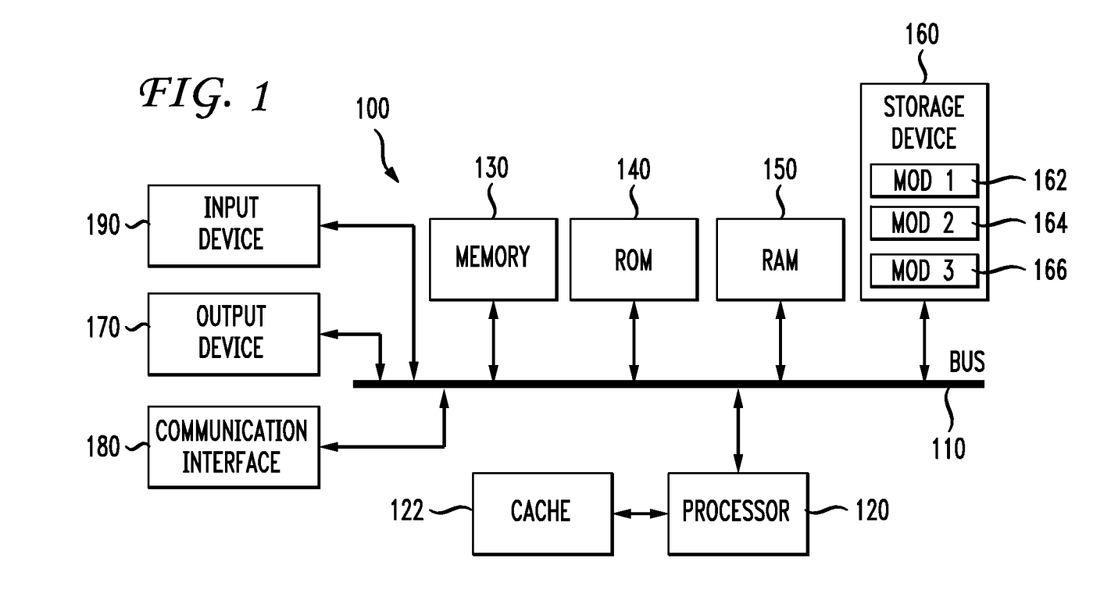
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics.

It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
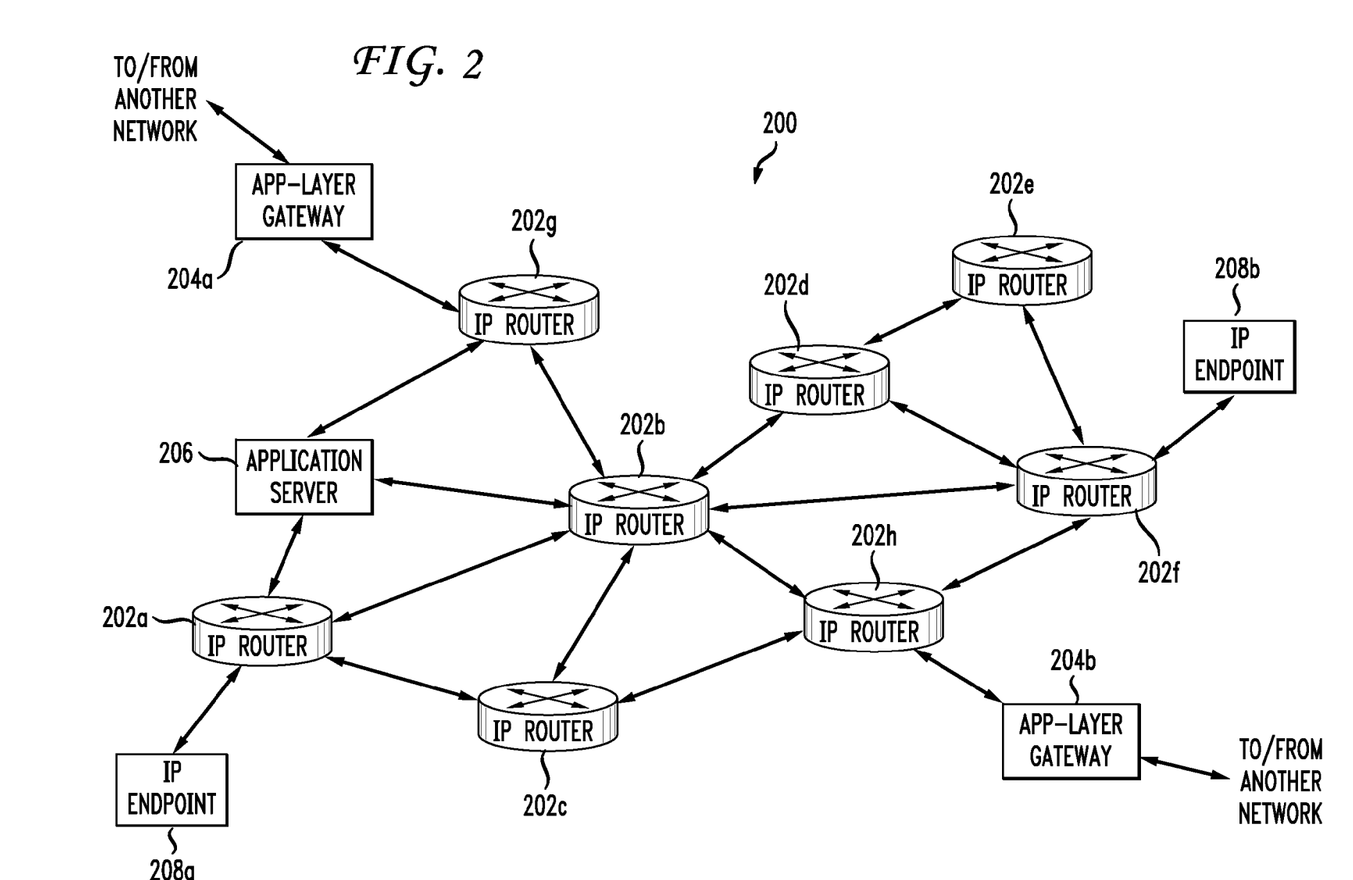
FIG. 2 illustrates an example network embodiment.

FIG. 2 illustrates an example telecommunications network embodiment 200. As shown in FIG. 2, telecommunications network 200 comprises application-layer gateways 204a, 204b, an application server 206, Internet Protocol (IP) endpoints 208a, 208b, and various interconnected IP routers 202a-202h. This particular configuration of an IP-based network is illustrative. The telecommunications network is not limited to an IP-based network and is not limited to this particular configuration of application-layer gateways 204a, 204b, IP routers 202a-202h, etc.

Each IP router 202a-202h is a device that receives IP packets via one or more incoming network links and forwards the received packets along one or more outgoing network links. Typically IP routers 202a-202h maintain dynamic routing tables that enable the routers to alter the paths by which traffic is transmitted through the network 200. IP routers 202a-202h can reroute network traffic along different paths through the network 200 over time in response to various conditions such as link failures, congested routes, toll charges, and so forth. A data source such as an IP endpoint 208a, 208b or a network transmission mechanism such as an IP router 202a-202h can mark certain packets according to their contents. For example, audio traffic is marked as audio packets, video traffic is marked as video packets, and data traffic is marked as data packets.

Application-layer gateways 204a, 240b are data-processing systems that are capable of providing one or more application-layer functions such as Voice over IP (VoIP), FTP, streaming video, Internet Protocol Television (IPTV), remote desktop services, and so forth. Moreover, application-layer gateways 204a, 240b are also capable of participating in the performing of one or more of the tasks described below and with respect to FIGS. 4-11.

Application server 206 is a data-processing system that provides one or more services to support a particular application such as VoIP or IPTV, and is also capable of participating in the performing of one or more of the tasks described below and with respect to FIGS. 4-11. In accordance with one illustrative embodiment, application server 206 provides VoIP services such as call setup between two or more Internet Protocol endpoints 208a, 208b, call modification, call termination, etc. The application server 206 can provide services for other applications as well, including videoconferencing, IPTV, instead of or in addition to VoIP.

Each IP endpoint 208a, 208b is a device such as an IP telephone, an IP headset, an IP handset, an IP softphone, or an IP conference phone that communicates with other devices over the network 200 in accordance with the Internet Protocol (IP). Moreover, IP endpoints 208a, 208b can also perform one or more of the tasks described below.

The disclosure now returns to a discussion of processing, analyzing and testing flows of audio packets in a packet network. This approach is related to a measure of the protection that audio packets receive in the process outlined above. The system 100 detects a period during which there is no jitter for audio packets and substantial jitter for other packets, such as video or data. The system 100 interprets such a period as positive proof that the COS 1 queue is protected or that its priority is being properly enforced because this pattern can only happen when the queue mechanisms give priority to audio packets in the COS 1 queue. The measure is based on the correlation between audio and data jitter over time. Roughly speaking, a strong correlation indicates the absence of protection. A correlation of zero in addition to strong temporal variations for data jitter indicates strong protection.

In addition, an inspection of a matrix of protection values can further indicate whether the CE or the PE is failing to provide a desired level of protection. If the lack of protection is observed in a row representing a single source to multiple destinations, then the CE is to blame. If the lack of protection is observed in a column representing multiple sources to a single destination, then the PE is to blame. Other patterns of protection do not attribute the blame squarely to either the CE or the PE.

In the case where there is zero correlation and no strong temporal variation in the data jitter, the circuit is overprovisioned to the point where the packets traverse the router at "wire speed" or with essentially no (or very minimal) delay. In this case, there is no build up in the queues and very minimal amounts of jitter which may even be undetectable. This situation can be observed, for example, when a new site is deployed and is now receiving the full load that it is designed to support. The system 100 can perform the same measurements of audio protection at the same time as data traffic is injected so as to create a build up of packets in the data queue and a strong temporal variation in the data jitter.

Figure 3:
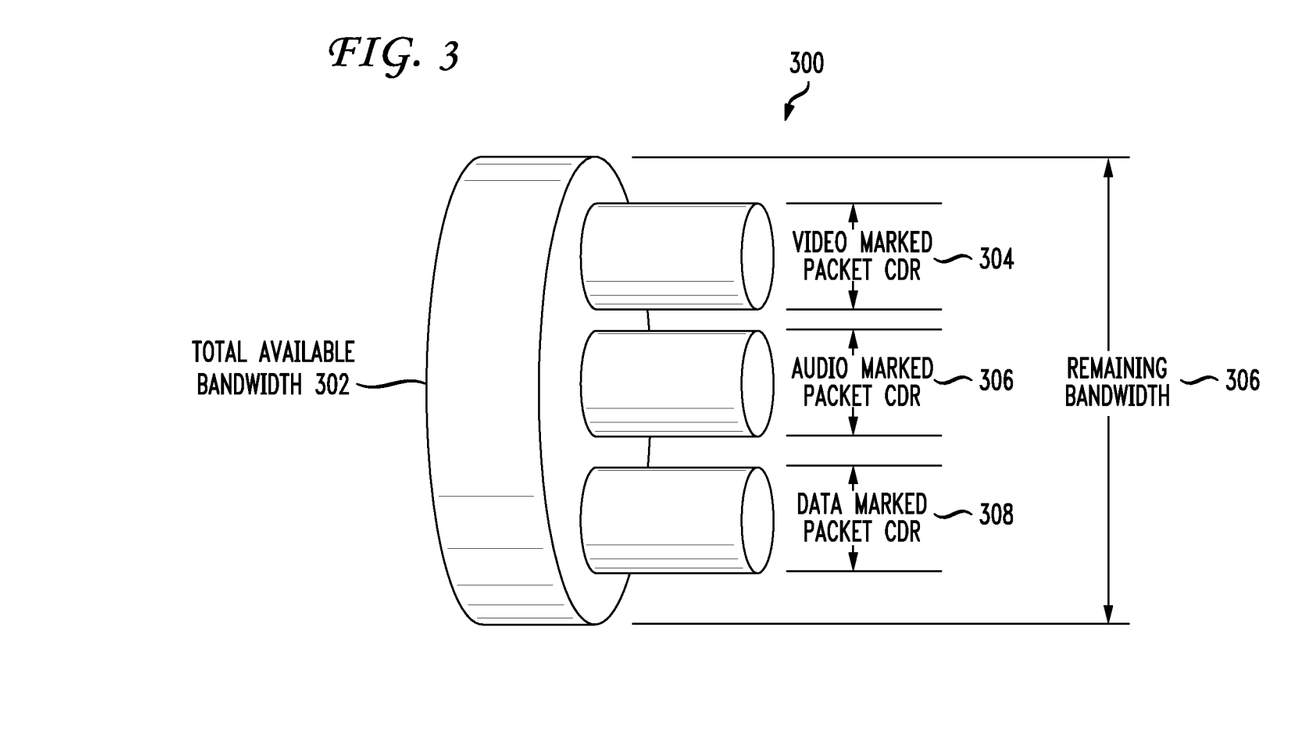
FIG. 3 illustrates an example committed data rate in a network.

FIG. 3 illustrates an example committed data rate (CDR) 300 in a network. The CDR is a minimum service level guaranteed by a network provider, such as an Internet Service Provider (ISP) or other network entity. CDR is sometimes referred to as committed information rate (CIR) because the concept extends beyond data packets to other types of packets such as video and audio packets. As new types of network traffic arise, a portion of the CDR 300 can be dedicated to those new types without departing from what is disclosed. In this example, the network 200 has a total available bandwidth 302, such as 1 gigabit per second. Within that available bandwidth, different queues or established CDRs provide guarantees of service for differently marked packets.

For example, video marked packets have a CDR 304 that may be 100 megabits per second, meaning that video marked packets up to 100 megabits per second are guaranteed to arrive within certain tolerances such as maximum latency, maximum percent of lost packets, and so forth. An audio marked packet CDR 306 is generally, but not necessarily, the highest priority CDR because of the sensitivity of audio traffic to packet delay and packet loss. In one aspect, audio marked packet CDR 306 guarantees that 5 megabits per second of audio marked packets travel essentially at wire speed, providing an extremely high level of service, but that audio market packet traffic in excess of 5 megabits per second is dropped or re-marked. A data marked packet CDR 308 is generally a lower level of service, but much larger bandwidth. For example, the data marked packet CDR 308 may be 250 megabits per second with very loose latency and dropped packet requirements. The CDRs 304, 306, 308 do not always occupy the entire available bandwidth 302. Remaining bandwidth 310 not covered by the CDRs 304, 306, 308 handles traffic on a best-effort basis with no guarantees. Thus, if audio marked packet traffic exceeds the audio marked packet CDR 306 in a network, audio packets may be dropped even though ample available bandwidth is available under other non-audio CDRs.

Having disclosed some basic network-related system components and concepts, the disclosure now turns to a method for managing a packet network. For the sake of clarity, the method is discussed in terms of (1) an exemplary system such as is shown in FIG. 1 configured to practice the method, (2) an exemplary network such as is shown in FIG. 2, and (3) in the context of CDRs as shown in FIG. 3.

Figure 4:
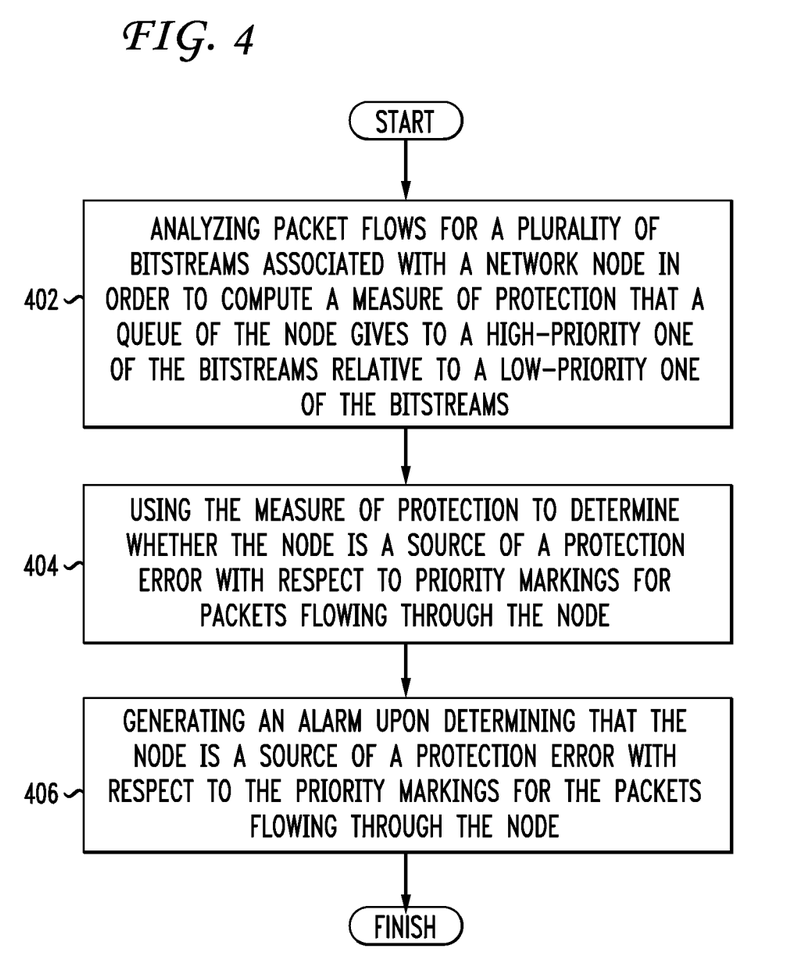
FIG. 4 illustrates a first exemplary method embodiment for managing a packet network

FIG. 4 illustrates a first exemplary method embodiment for managing a packet network. The system 100 analyzes packet flows for bitstreams associated with a network node in order to compute a measure of protection that a queue of the node gives to a high-priority one of the bitstreams relative to a low-priority one of the bitstreams (step 402). The system uses the measure of protection to determine whether the network node is a source of a protection error with respect to priority markings for packets flowing through the node (step 404). The system 100 generates an alarm upon determining that the network node is a source of a protection error with respect to the priority markings for the packets flowing through the network node (step 406).

This approach includes systems and methods for analyzing multiple data streams through a particular node in the network and analyzing each data stream in order to determine whether a problem with respect to processing packets based on their markings occurs at an individual node. Any individual stream of bits from a particular node is insufficient to determine whether that node is causing or experiencing a problem. Therefore, this solution involves analyzing a plurality of data streams with respect to their specific markings (i.e., audio, video, data) and can therefore identify on a node by node basis whether problems exist. For example, the system measures the protection of a queue ranging from 0 (no protection) to 1 (full protection) that can be applied to an audio or video queue for a particular source and destination. The integration of the protection for sources and destinations in a mesh can be used to detect problems with the CE (Customer Edge) or with the PE (Provider edge) routers of individual sites. The analysis of the protection in conjunction with the flow data can be used to distinguish between circuit problems and problems in the configuration of queues.

For example, if an SLA provides a 5 megabit per second audio CDR, and if the CE and PE associated with this agreement are not configured or capable of delivering on the terms of this agreement, the system 100 generates an alarm that will include the data supporting the conclusion as well as an indication as to the reason behind the failure (i.e. configuration at the CE, configuration at the PE, circuit problem, insufficient computing power at the CE or insufficient computing power at the PE).

This approach is different than standard network analysis utilities because it performs an analysis that integrates information from both end-to-end testing in multiple queues, from packet flows traversing critical nodes and from the details of the SLAs and because it draws specific conclusions such as "the configuration of the audio queue at the CE is not providing the protection of the agreement". The system defines "protection" in the integrated analysis of network traffic based on packet markings in combination with SLAs and CDRs.

Figure 5:
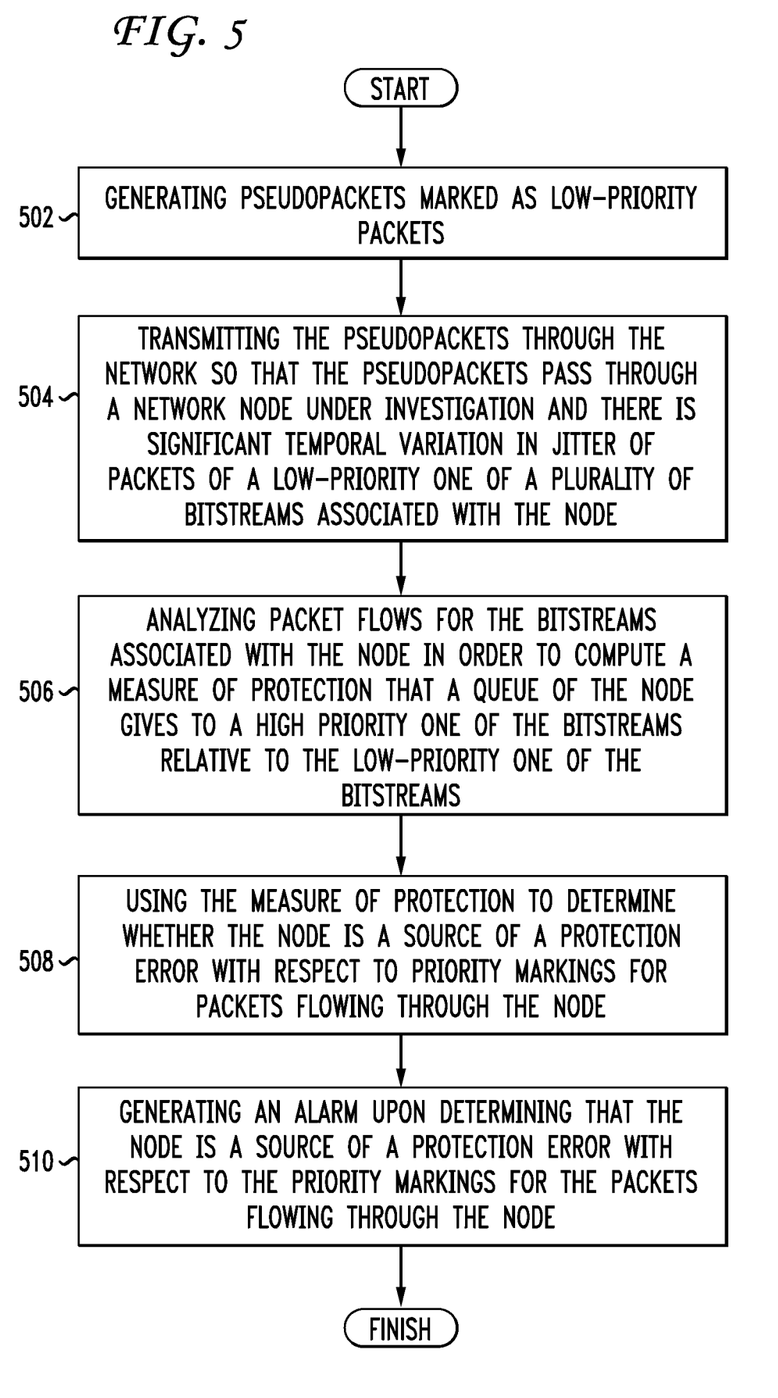
FIG. 5 illustrates a second exemplary method embodiment for managing a packet network.

FIG. 5 illustrates a second exemplary method embodiment for managing error detection in a packet network. The system 100 generates pseudopackets marked as low-priority packets (step 502). The system 100 transmits the pseudopackets through the packet network so that the pseudopackets pass through a network node under investigation and there is significant temporal variation in jitter of packets of a low-priority one of a plurality of bitstreams associated with the node (step 504). The system 100 analyzes packet flows for the bitstreams associated with the network node in order to compute a measure of protection that a queue of the node gives to a high-priority one of the bitstreams relative to the low-priority one of the bitstreams (step 506). The system uses the measure of protection to determine whether the node is a source of a protection error with respect to priority markings for packets flowing through the node (step 508). The system 100 generates an alarm upon determining that the node is a source of a protection error with respect to the priority markings for the packets flowing through the node (step 510).

For example, in step 502 the system 100 inserts a specific pattern of pseudopackets marked as low-priority packets designed to push the data to SLA or CDR limits in order to detect quality of service issues (i.e. how packets are labeled, how marked packets are treated by individual network nodes, and so forth). This approach is related to FIG. 4 which, for example, measures the protection of a high-priority audio or video bitstream provide by a high-priority audio or video queue. For example, if network traffic during a testing period is low enough such that the audio packet bandwidth allocation according to an SLA is not exceeded, then each audio marked packet is just processed at wirespeed whether the packet markings are processed appropriately or not. There may be a need to generate pseudodata to push the network to the SLA limits. In another example, assume that the network is handling a large amount of video and data packets but a minimal amount of audio packets. Again, the system can tailor the pseudodata as necessary to test a particular aspect of the packet marking recognition and treatment within the network. In addition, during a time of low network traffic, the pseudopackets can be generated at a plurality of source nodes and can be transmitted so that they converge at a particular node under investigation, so that the desired conditions are triggered only at this particular node.

The advantage of this approach is that actively inserting traffic triggers the desired conditions, thereby quickly pinpointing how and why a network fails and saving time when troubleshooting. In contrast, previous approaches wait passively for a suitable pattern of network traffic flows.

During the initial stages of system deployment, this active testing mechanism can be used to provide early detection for prompt correction of packet errors. This avoids the costly need to open a trouble ticket and start diagnostics and repair efforts when the network is live, which costs money to take users offline. This enables the quick localization of errors rather than requiring a network administrator to wait for a sufficient amount of passive data to detect an error. The network administrator can control the error detection process actively including the packet streams and their markings.

Figure 6:
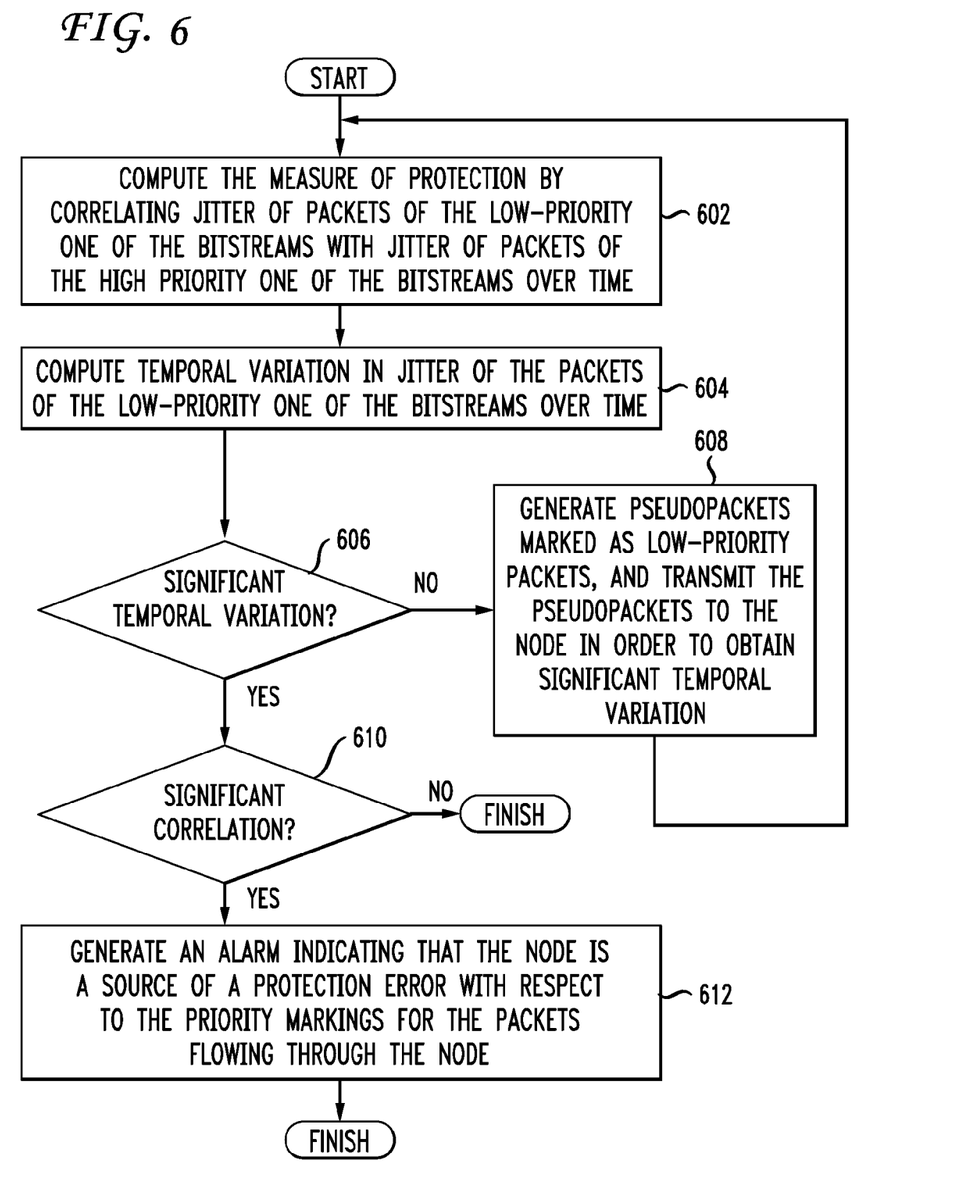
FIG. 6 illustrates a third exemplary method embodiment for managing a packet network.

FIG. 6 illustrates a third exemplary method embodiment for managing error detection in a packet network. This third exemplary method combines aspects of the method of FIG. 4 and aspects of the method of FIG. 5, so that pseudopackets are used only as needed to obtain a significant temporal variation. In FIG. 6, the measure of protection is computed by correlating jitter of packets of the low-priority one of the bitstreams with jitter of packets of the high-priority one of the bitstreams over time (step 602). Also, the temporal variation in jitter of the packets of the low-priority one of the bitstreams is computed over time (step 604). For example, the correlation coefficient is computed between packet delay of low-priority packets and packet delay of high-priority packets of bitstreams from a source to a destination over a time interval, and the standard deviation of the packet delay of the low-priority packets is also computed over this same time interval. If there is not significant temporal variation in jitter of the low priority packets (step 606), then pseudopackets marked as low-priority packets are generated, and these pseudopackets are transmitted to the node in order to obtain significant temporal variation. The method loops from step 608 back to step 602 in order to re-compute the correlation (step 602) and to re-compute the temporal variation (step 604) in the presence of the pseudopackets. In this fashion, once there is a sufficient level of generation and transmission of pseudopackets (step 608), then a significant temporal variation will be found (step 608) so that the method will continue from step 606 to step 610. In this case, if there is not a significant correlation (step 610), then no protection error is indicated so that the method is finished with analysis of the high and low priority bitstreams for the node under investigation. Otherwise, if a significant correlation is found in step 610, then execution continues to step 612 to generate an alarm indicating that the node is a source of a protection error with respect to the priority markings for the packets flowing through the node.

For example, in step 606 the standard deviation of the packet delay of the low-priority packets is compared to a first threshold, and in step 610 the correlation coefficient between packet delay of low-priority packets and packet delay of high-priority packets is compared to a second threshold. The thresholds are preset so that when an alarm is generated in step 612, the alarm will indicate a protection error with a desired degree of confidence appropriate for a specific action to be taken in response to the alarm. For example, the alarm is sent to a system administrator for possible repair or replacement of a router in the network. The measured standard deviation of the packet delay of the low-priority packets and the measured correlation coefficient between packet delay of low-priority packets and packet delay of high-priority packets provides supporting evidence of the reported protection error.

Figure 7:
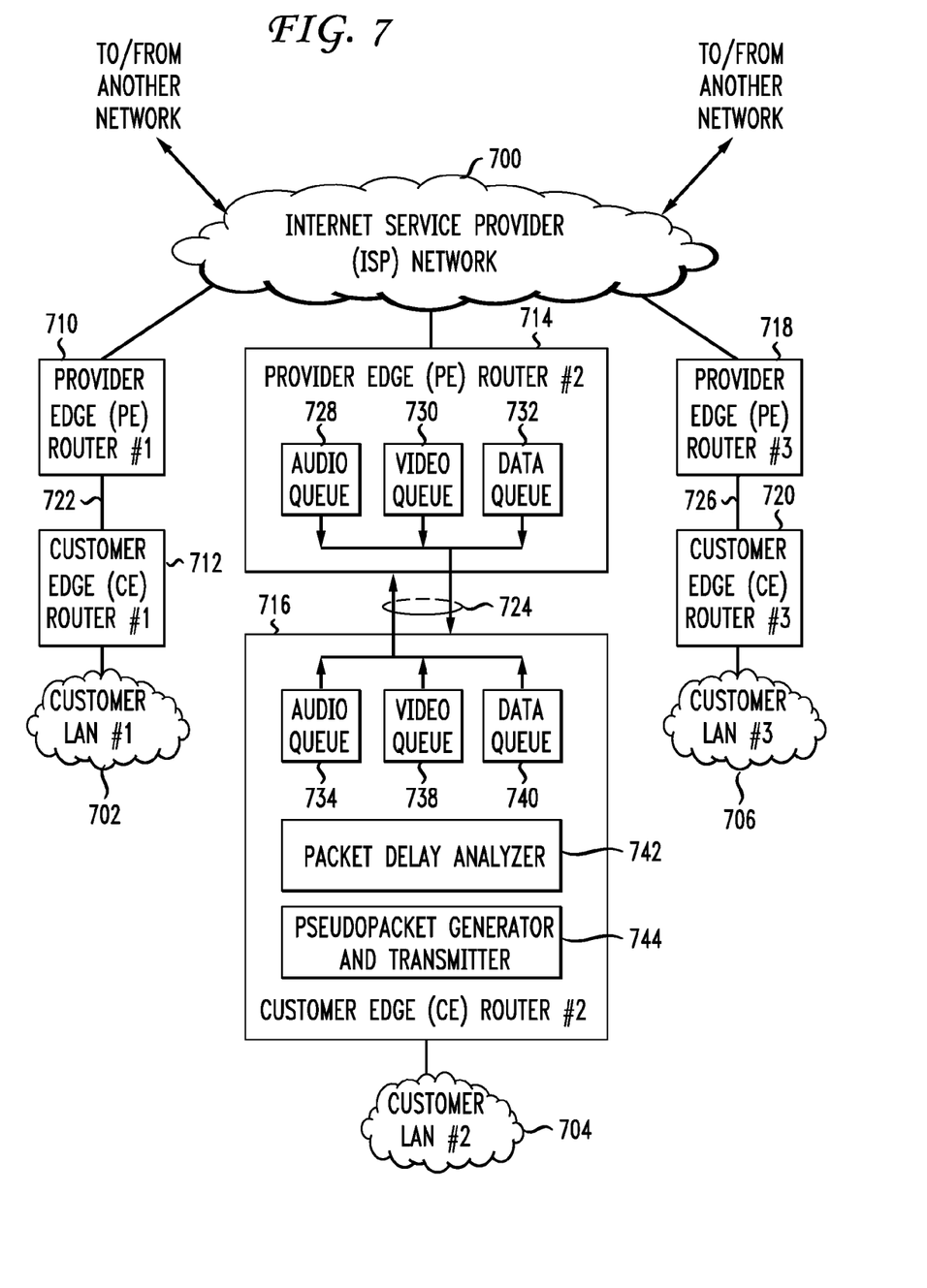
FIG. 7 illustrates provider edge (PE) routers and customer edge (CE) routers in an example network embodiment.

As introduced above, an inspection of a matrix of protection values can further indicate whether a customer edge (CE) router or a provider edge (PE) router is failing to provide a desired level of protection. FIG. 7, for example, shows a network embodiment in which an Internet Service Provider (ISP) network 700 provides service to at least three customers. The ISP network 700 is similar to the network 200 shown in FIG. 2. The network in FIG. 7 further includes a customer local area network (LAN) for each customer, and a customer edge (CE) router and a provider edge (PE) router for each customer. Each customer LAN includes customer endpoint equipment, such as VoIP phones or computer terminals. In particular, FIG. 7 shows a first customer LAN 702, a second customer LAN 704, and a third customer LAN 706. A first provider edge (PE) router 710 and a first customer edge (CE) router 712 connect the ISP network 700 to the first customer LAN 702. A second provider edge (PE) router 714 and a second customer edge (CE) router 716 connect the ISP network 700 to the second customer LAN 704. A third provider edge (PE) router 718 and a third customer edge (CE) router 720 connect the ISP 700 to the third customer LAN 706

Each provider edge (PE) router is connected by a limited capacity link to its respective customer edge (CE) router. A first limited capacity link 722 connects the first provider edge (PE) router 710 to the first customer edge (CE) router 712. A second limited capacity link 724 connects the second provider edge (PE) router 714 to the second customer edge (CE)

router 716. A third limited capacity link 726 connects the third provider edge (PE) router 718 to the third customer edge (CE) router 720.

Each provider edge (PE) router includes an audio queue, a video queue, and a data queue for queuing audio, video, or data packets, respectively, which are transmitted over its limited capacity link to its respective customer edge (CE) router. For example, the second provider edge (PE) router 714 includes an audio queue 728, a video queue 730, and a data queue 732. Each customer edge (CE) router includes an audio queue, a video queue, and a data queue for queuing audio, video, or data packets, respectively, which are transmitted over its limited capacity link to its respective provider edge (PE) router. For example, the second provider edge (PE) router 714 includes an audio queue 734, a video queue 738, and a data queue 740.

In the example of FIG. 7, each customer edge (CE) router includes a respective packet delay analyzer for computing the correlation coefficient between packet delay of low-priority packets and packet delay of high-priority packets of bitstreams to the customer edge (CE) router from other customer edge (CE) routers, and for computing the standard deviation of the packet delay of the low-priority packets. Each customer edge (CE) router also includes a respective pseudopacket generator and transmitter for generating and transmitting pseudopackets marked as low-priority packets to other customer edge (CE) routers. For example, the customer edge (CE) router 716 includes a packet delay analyzer 742 and a pseudopacket generator and transmitter 744.

When the second customer edge (CE) router 716 is under investigation as a possible source of a protection error, the pseudopacket generator and transmitter 744 transmits pseudopackets marked as low-priority packets to the first customer edge (CE) router 712 and to the third customer edge (CE) router 720. When the second provider edge (PE) router 714 is under investigation as a possible source of a protection error, pseudopacket generators and transmitters in the first customer edge (CE) router 712 and the third customer edge (CE) router 720 transmit pseudopackets marked as low-priority packets to the second customer edge (CE) router 716. In either case, the packet delay analyzers report respective packet delay statistics for received bitstreams from plural source customer edge (CE) routers to an application server for further analysis as introduced above with respect to FIGS. 4, 5, and 6.

Figure 8:
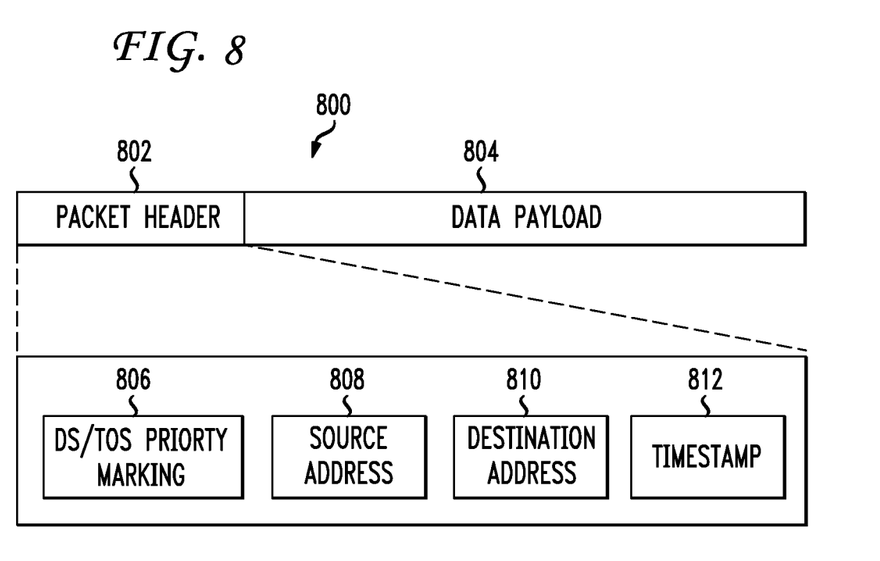
FIG. 8 illustrates a specific IP packet configuration for use in the example network embodiment of FIG. 7.

FIG. 8 shows details of a packet 800 transmitted through the network of FIG. 7. The packet 800 includes a packet header 802 and a data payload 804. The packet header 802 includes a differentiated service (DS) or type of service (TOS) priority marking 806, a source address 808, a destination address 810, and a timestamp 812 indicating when the packet 800 was transmitted from a source, such as a customer edge (CE) router. When a customer edge (CE) router receives the data packet 800, the packet delay analyzer in the customer edge (CE) router computes a packet delay as the difference between the timestamp 812 and the current local time according to a clock in the customer edge (CE) router. Any relatively constant time offset between respective clocks of the different customer edge (CE) routers has an insubstantial effect upon the respective correlation coefficient and standard deviation computed by the packet delay analyzer for the bitstreams from each source customer edge (CE) router.

Figure 9:
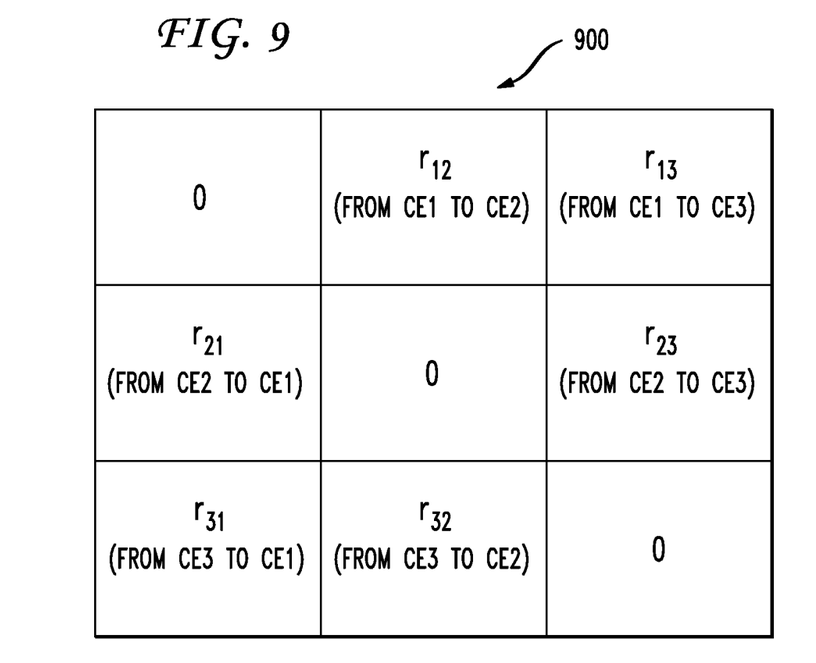
FIG. 9 illustrates a correlation matrix for packet transmission jitter in the example network embodiment of FIG. 7.

As shown in FIG. 9, the correlation coefficients for the bitstreams between different ones of the three customer edge (CE) routers (712, 716, and 720 in FIG. 7) form a matrix 900. The diagonal elements of this matrix are not defined in this example and therefore they are set to zero by default. Otherwise, as shown in FIG. 9, the matrix element $r_{ij}$ is the correlation coefficient for the bitstreams from an ith source customer edge (CE) router to a jth destination customer edge (CE) router.

Figure 10:
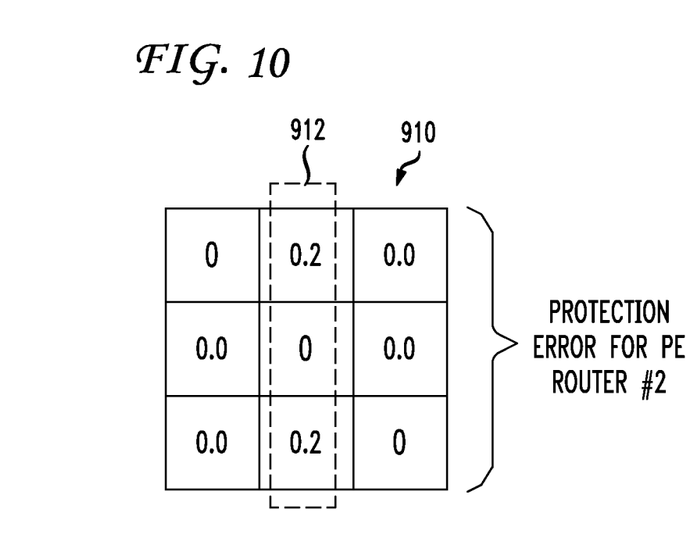
FIG. 10 illustrates a specific example of values in a column of a correlation matrix indicating a protection error for a provider edge (PE) router in the example network embodiment of FIG. 7.

FIG. 10 shows a specific example of values in a column 912 of a correlation matrix indicating a protection error for the second provider edge (PE) router (714 in FIG. 7). In general, significant correlations in plural elements in the jth column of the correlation matrix indicate a protection error for the jth provider edge (PE) router.

Figure 11:
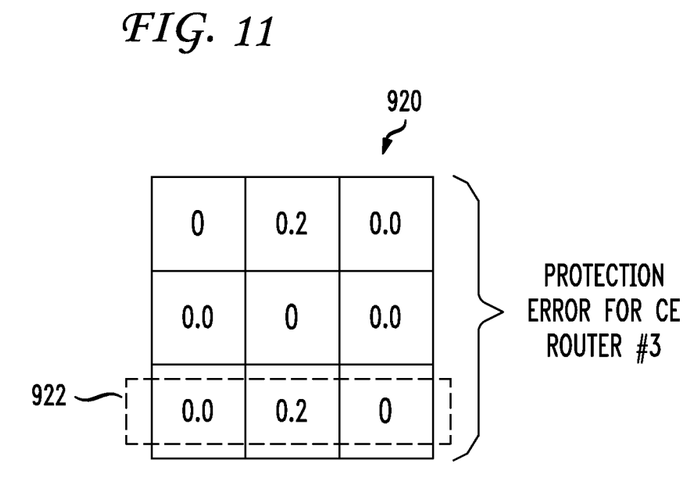
FIG. 11 illustrates a specific example of values in a row of a correlation matrix indicating a protection error for a customer edge (CE) router in the example of the network embodiment of FIG. 7.

FIG. 11 shows a specific example of values in a row 922 of a correlation matrix 920 indicating a protection error for the third customer (CE) router (720 in FIG. 7). In general, significant correlations in plural elements in the ith row of the correlation matrix indicate a protection error for the ith customer edge (CE) router.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
analyzing, via a processor, packet flows for bitstreams associated with a network node in order to compute a measure of protection that a queue of the network node gives to a high-priority one of the bitstreams relative to a low-priority one of the bitstreams, wherein the measure of protection is based on priority markings for packets flowing through the network node and respective committed data rates, wherein the network node is one of a provider edge router transmitting the bitstreams to a customer edge router and the customer edge router transmitting the bitstreams to the provider edge router;
using the measure of protection to determine whether the network node is a source of a protection error with respect to the priority markings for the packets;
computing a matrix of protection values for respective bitstreams between a plurality of customer edge routers and passing through a plurality of provider edge routers;
inspecting one of a row and a column of the matrix to find one of a lack of protection from a single source to multiple destinations indicating that one of the plurality of customer edge routers is the source of the protection error, and a lack of protection from multiple sources to a single destination indicating that one of the plurality of provider edge routers is the source of the protection error; and
generating an alarm upon at least one of determining that the network node is the source of the protection error with respect to the priority markings for the packets and finding the lack of protection.

2. The method of claim 1, wherein the high-priority one of the bitstreams is an audio bitstream, and the low-priority one of the bitstreams is one of a video bitstream and a data bitstream, and the protection error is an error of the network node failing to give packets of the audio bitstream priority over one of packets of the video bitstream and packets of the data bitstream.

3. The method of claim 1, wherein analyzing packet flows further comprises correlating jitter of packets of the low-priority one of the bitstreams with jitter of packets of the high-priority one of the bitstreams over time to compute the measure of protection.

4. The method of claim 1, further comprising generating pseudopackets marked as low-priority packets and transmitting the pseudopackets through the network node so that there is significant temporal variation in jitter of the packets of the low-priority one of the bitstreams over time.

5. The method of claim 1, wherein using the measure of protection to determine whether the network node is the source of a protection error further comprises computing a temporal variation in jitter of the packets of the low-priority one of the bitstreams over time, and determining that the network node is the source of the protection error with respect to priority markings for packets flowing through the network node upon finding that the temporal variation indicates significant temporal variation and the measure of protection indicates a failure of the network node to give packets of the high-priority one of the bitstreams priority over packets of the low-priority one of the bitstreams.

6. A system comprising:
a processor; and
a non-transitory computer-readable storage medium having stored therein instructions which, when executed by the processor, cause the processor to perform operations comprising:
analyzing packet flows for bitstreams associated with a network node in order to compute a measure of protection that a queue of the network node gives to a high-priority one of the bitstreams relative to a low-priority one of the bitstreams, wherein the measure of protection is based on priority markings for packets flowing through the network node and respective committed data rates, wherein the network node is one of a provider edge router transmitting the bitstreams to a customer edge router and the customer edge router transmitting the bitstreams to the provider edge router;
using the measure of protection to determine whether the network node is a source of a protection error with respect to the priority markings for the packets;
computing a matrix of protection values for respective bitstreams between a plurality of customer edge routers and passing through a plurality of provider edge routers;
inspecting one of a row and a column of the matrix to find one of a lack of protection from a single source to multiple destinations indicating that one of the plurality of customer edge routers is the source of the protection error, and a lack of protection from multiple sources to a single destination indicating that one of the plurality of provider edge routers is the source of the protection error; and
generating an alarm upon at least one of determining that the network node is the source of the protection error with respect to the priority markings for the packets and finding the lack of protection.

7. The system of claim 6, wherein the high-priority one of the bitstreams is an audio bitstream, and the low-priority one of the bitstreams is one of a video bitstream and a data bitstream, and the protection error is an error of the network node failing to give packets of the audio bitstream priority over one of packets of the video bitstream and packets of the data bitstream.

8. The system of claim 6, wherein analyzing packet flows further comprises correlating jitter of packets of the low-priority one of the bitstreams with jitter of packets of the high-priority one of the bitstreams over time to compute the measure of protection.

9. The system of claim 6, wherein the non-transitory computer-readable storage medium stores additional instructions which, when executed by the processor, result in the operations further comprising generating pseudopackets marked as low-priority packets and transmitting the pseudopackets through the network node so that there is significant temporal variation in jitter of the packets of the low-priority one of the bitstreams over time.

10. The system of claim 6, wherein using the measure of protection to determine whether the network node is a source of a protection error further comprises computing a temporal variation in jitter of the packets of the low-priority one of the bitstreams over time, and determining that the network node is a source of a protection error with respect to priority markings for packets flowing through the network node upon finding that the temporal variation indicates significant temporal variation and the measure of protection indicates a failure of the network node to give packets of the high-priority one of the bitstreams priority over packets of the low-priority one of the bitstreams.

11. A non-transitory computer-readable storage medium having stored therein instructions which, when executed by a processor, cause the processor to perform operations comprising:
analyzing packet flows for bitstreams associated with a network node in order to compute a measure of protection that a queue of the network node gives to a high-priority one of the bitstreams relative to a low-priority one of the bitstreams, wherein the measure of protection is based on priority markings for packets flowing through the network node and respective committed data rates, wherein the network node is one of a provider edge router transmitting the bitstreams to a customer edge router and the customer edge router transmitting the bitstreams to the provider edge router;
using the measure of protection to determine whether the network node is a source of a protection error with respect to the priority markings for the packets;
computing a matrix of protection values for respective bitstreams between a plurality of customer edge routers and passing through a plurality of provider edge routers;
inspecting one of a row and a column of the matrix to find one of a lack of protection from a single source to multiple destinations indicating that one of the plurality of customer edge routers is the source of the protection error, and a lack of protection from multiple sources to a single destination indicating that one of the plurality of provider edge routers is the source of the protection error; and
generating an alarm upon at least one of determining that the network node is the source of the protection error with respect to the priority markings for the packets and finding the lack of protection.

12. The non-transitory computer-readable storage medium of claim 11, wherein the high-priority one of the bitstreams is an audio bitstream, and the low-priority one of the bitstreams is one of a video bitstream and a data bitstream, and the protection error is an error of the network node failing to give packets of the audio bitstream priority over one of packets of the video bitstream and packets of the data bitstream.

13. The non-transitory computer-readable storage medium of claim 11, wherein analyzing packet flows further comprises correlating jitter of packets of the low-priority one of the bitstreams with jitter of packets of the high-priority one of the bitstreams over time to compute the measure of protection.

14. The non-transitory computer-readable storage medium of claim 11, wherein the non-transitory computer-readable storage medium stores additional instructions which result in the operations further comprising generating pseudopackets marked as low-priority packets, and transmitting the pseudopackets through the network node so that there is significant temporal variation in jitter of the packets of the low-priority one of the bitstreams over time.

15. The non-transitory computer-readable storage medium of claim 11, wherein using the measure of protection to determine that the network node is a source of a protection error with respect to priority markings for packets flowing through the network node comprises computing a measure of temporal variation in jitter of the packets of the low-priority one of the bitstreams over time, and determining that the network node is the source of the protection error with respect to priority markings for packets flowing through the network node upon finding that the measure of temporal variation indicates significant temporal variation, and the measure of protection indicates a failure of the network node to give packets of the high-priority one of the bitstreams priority over packets of the low-priority one of the bitstreams.

* * * * *